United States Patent [19]

Lapointe

[11] 4,391,359

[45] Jul. 5, 1983

[54] SAMPLE SPLITTER

[76] Inventor: Joseph A. Lapointe, 223 Sprindale Ave., Pointe Claire, Quebec, Canada

[21] Appl. No.: 219,268

[22] Filed: Dec. 22, 1980

[51] Int. Cl.³ .............................................. B65G 13/00
[52] U.S. Cl. ..................................................... 193/23
[58] Field of Search .................. 193/44, 45, 47, 48, 193/2 R, 2 B, 23, 27, 28; 209/658, 659, 911; 198/453, 525, 565, 631

[56] References Cited

U.S. PATENT DOCUMENTS

| 892,519 | 7/1908 | Hinchman | 193/2 B |
| 2,832,460 | 4/1958 | Lauer | 193/44 X |
| 3,319,768 | 5/1967 | Holzhauer | 198/525 X |

Primary Examiner—John J. Love
Assistant Examiner—Gene A. Church

[57] ABSTRACT

A sample splitter is formed by a chute that is sloped towards its discharge end and is oscillated back and forth on a horizontal path that is substantially perpendicular to the axial center line of the chute. The chute itself is substantially symmetrical on opposite sides of the axial center line and the walls are sloped upward so that the material forming the sample to be split moves along the chute with a sliding or rolling action back and forth across the axial center line of the chute without significant bouncing of the discrete pieces of the material. An elongated V-shaped plow is positioned at the discharge end of the chute with the apex of the plow forming a substantially straight line that is in axial alignment with the center line of the chute at the mid-point of the oscillation of the chute. The oscillation motion of the chute causes the material of the sample to slide down the chute and to be projected off the discharge end on one side or the other of the apex of the plow.

7 Claims, 8 Drawing Figures

SAMPLE SPLITTER

FIELD OF THE INVENTION

The present invention relates to a sample splitter. More specifically the present invention relates to a technique for dividing a large sample into a plurality of small portions of similar and representative composition by sliding the sample material down a horizontally oscillating inclinded chute and having plow means at the bottom of the chute to separate the sample into a number of portions which contain material which is representative of the original sample material.

DESCRIPTION OF THE PRIOR ART

The method of obtaining a representative sample from a larger sample of particulate or small discrete elements such as wood chips is a problem that is persisted over the years and has never been satisfactorily solved.

One of the conventional methods of splitting a sample is a technique known as coning and quartering. Here a conical pile of the material to be separated (hereinafter referred to as wood chips although other materials may be used) is quartered by running a pair of mutually perpendicular axially extending lines through the conical pile thereby to form 4 equal quarters. Obviously such a technique is not particularly accurate due to the inaccuracies for example in manually forming the cone and then making the separations into quarters.

Commercial sample splitter equipment includes the Tyler Sample Splitter. This device is composed of a plurality of fixed side by side chutes directing material in opposite directions. The chips are poured along the full width of the chutes, however, it is very difficult to distribute the material uniformly across the width of the feed opening i.e. the fines can be concentrated towards one particular location since feeding the material uniformly along the full width of the chutes is quite difficult. Also elongated material such as wood chips can become lodged at the front of the sample dividing elements and interfere with the proper functioning of such an apparatus.

It has also been proposed to reduce the size of the sample utilizing a device consisting essentially of a horizontal spinning disc with a small cone in the centre enclosed in a cylindrical housing. A chip sample is introduced through a funnel in the top of the housing onto the cone and the chips are thrown out by centrifugal force applied through the spinning disc toward the periphery of the disc and fall into appropriately positioned containers. The inlets to these containers form segments of circle of a size proportional to the fraction of sample required. For example, a container having an inlet forming a 36° segment would theoretically catch 10% of the sample poured into the top of the reducer. With this device, if the chips are non-uniformly fed i.e. predominently to one side or the other of the cone, it will have a significant effect on the end result of the split portions and thus a representative sample portion will not necessarily be obtained.

A similar device using a vertical disc rotating around the horizontal axis is disclosed in Canadian Pat. No. 804,847, issued Jan. 28, 1979 to O'Heron et al, however, in this case the disc is provided with a pair of mutually transvere passages with deflectors at their ends to deflect the chips in opposite directions. This device will reduce the chip sample in half but because of the centrifical action, there is areasonable possibility of introduction of further fines i.e. by abrasion of the chips while they are being classified and thereby contaminate the sample.

BROAD DESCRIPTION OF THE PRESENT INVENTION

Thus, the object of the present invention is to provide a sample splitter that will relatively accurately divide the sample into a plurality of discrete smaller but representative portions and that can operate with elongated material such as the slivers in wood chips.

The present invention relates to a sample splitter comprising a chute sloped downwardly from a rear end to a discharge end, means for oscillating said chute on an essentially horizontal path substantially perpendicular to the axial centre line of said chute, said chute being substantially symetrical on opposite sides of said axial centre line, side walls on said chute on opposite sides of said center line being sloped upwardly in a manner so that the material forming the sample moves with a rolling or sliding action in a zig zag path on said chute and without significant bouncing of the material as the chute is oscillated, an elongated V-shaped plow at the discharge end of the chute to intercept material issuing from said chute, the line forming the apex of said V-shaped plow being substantially aligned with said axial center line when said chute is at the mid point of its oscillation.

BRIEF DESCRIPTION OF THE DRAWINGS

Further features, objects and advantages will be evident in the following detailed description of preferred embodiments of the present invention taken in conjunction with the accompanying drawings in which.

DESCRIPTION OF THE PREFERRED EMBODIMENTS

Figure 1:
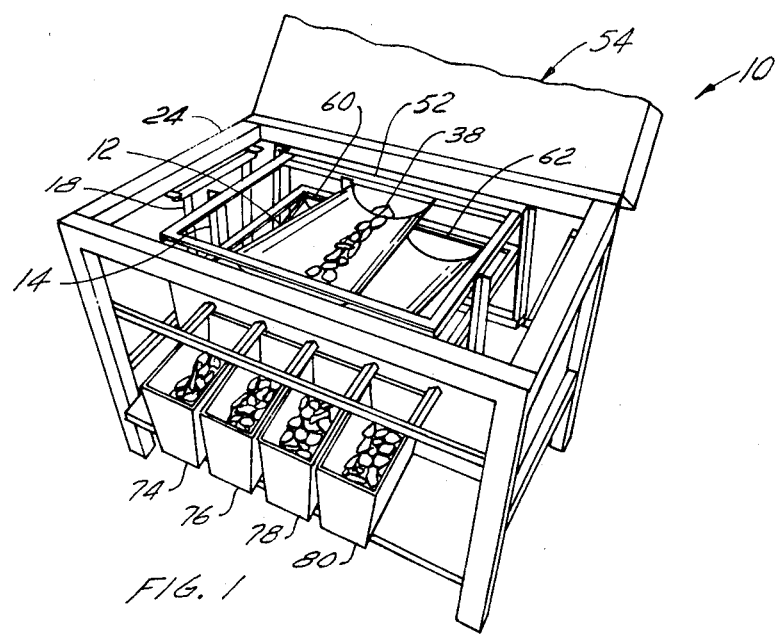
FIG. 1 is a perspective view of the sample splitter with the top opened showing the chutes.
Figure 2:
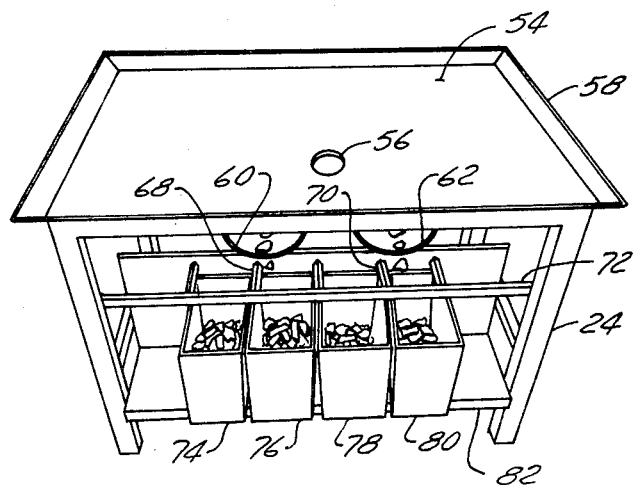
FIG. 2 is a perspective view of the sampler with the top enclosed illustrating the feeding aperture in the top wall.
Figure 3:
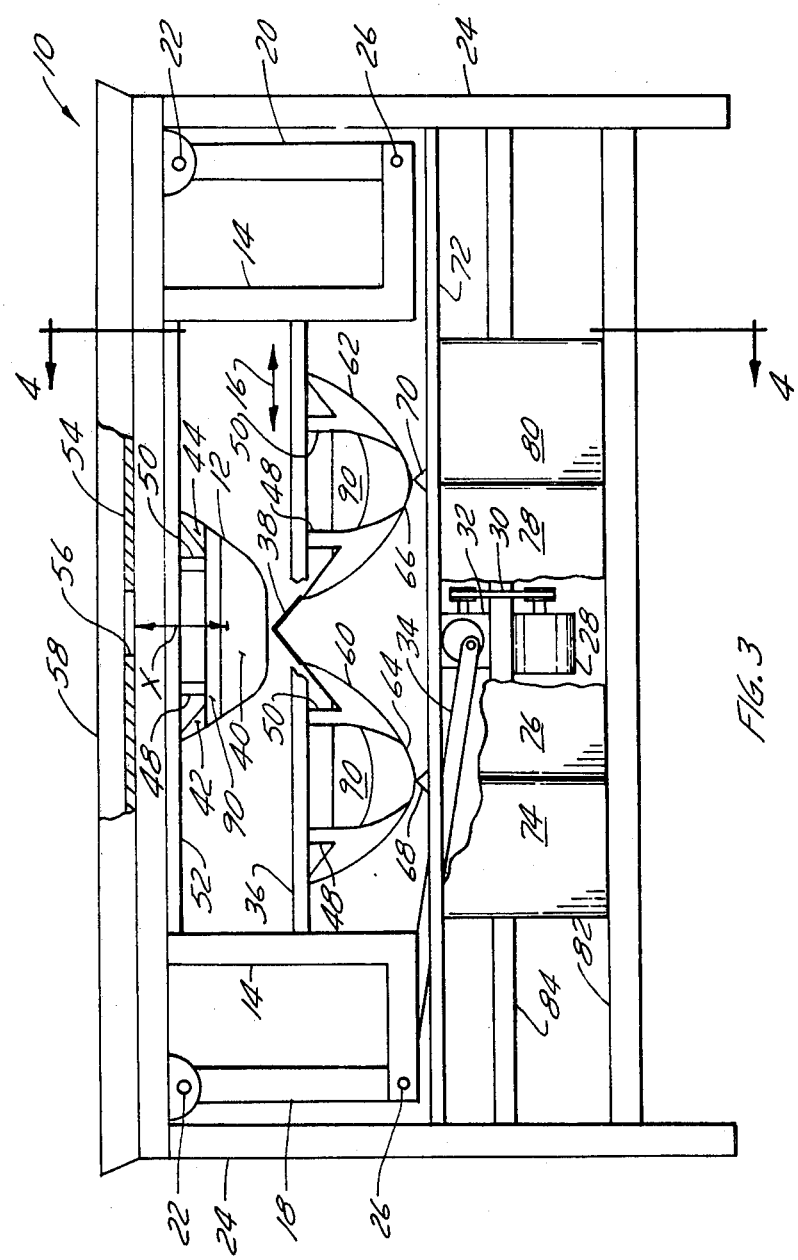
FIG. 3 is a schematic front elevation view of the sampler illustrating two different types of chutes.
Figure 4:
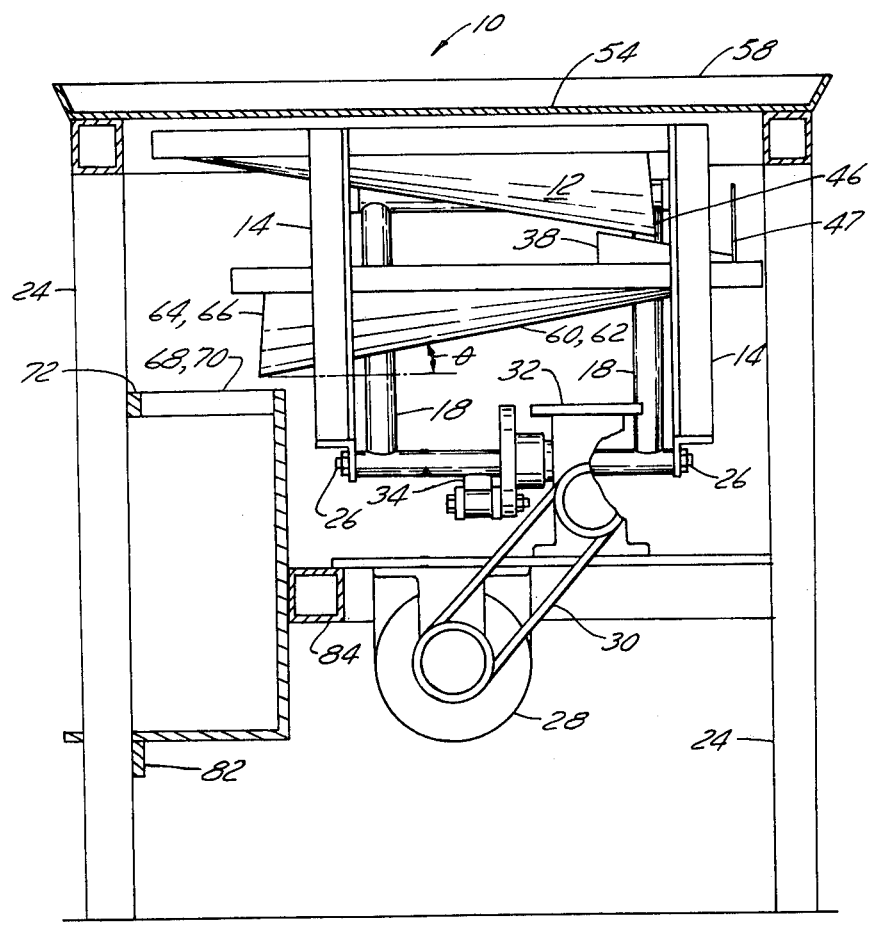
FIG. 4 is a section along the line 4—4 of FIG. 3 with parts omitted for clarity and incorporating chute structures as illustrated in FIGS. 5 and 6.

The sample splitter 10 forming the present invention consists essentially of slopped tray such as that indicated at 12, illustrated in FIGS. 1 and 3 and 4. Tray 12 is in turn mounted on a suitable support frame 14, mounted for horizontal oscillation as indicated by the arrow 16 via the support structures 18 and 20. Each of the support structures 18 and 20 is composed of a pair of supporting arms pivotably mounted as indicated at 22 to the main supporting frame 24 and at the bottom by a pivot 26 to the frame 14.

The frame 14 is oscillated by a suitable motor 28 driven by a belt drive indicated at 30, a reducer 32 which in turn drives the crank 34 that is connected at pivot 26 to oscillate the frame 14.

Also mounted on the frame 4 in the illustrated arrangement, the crossbar 36 is a first plow 38. It will be noted that the plow 38 is substantially V-shaped with the line forming the apex of the V aligned with the longitudinal axis of the chute 12 when the chute is in the mid point of its ossilation. This plow 38 is mounted on the frame 14 and thus is permanently fixed relative to the chute 12. In the particular embodiment illustrated chute 12 is equivalent to the chute shown in FIGS. 5 and 6 with a minor modification in that the height of the sides 42 and 44 is lower at the discharge end of the chute 12 which necessitated the supporting straps 48 and 50, to suspend the chute 12 at the requisite slope from one of the top pair of crossbars 52 of the frame 14.

The height X between the bottom 40 of the tray 12 and the top closure plate 54 immediately beneath the apparture 56 together with the size of the apperture 56 provides a metering arrangement positioned a significant distance from the discharge end 46 of the chute 12 to ensure that the chip feed does not, under reasonable feeding conditions, exceed an acceptable maximum rate. The height X relative to the size of the apperture 56 will be such that (within normal limits) regardless of how the chips are pushed through the apperture 56 they will land on the flat bottom of 40 of the chute 12 and will be automatically properly positioned for accurate samples spitting. In the specific embodiment (for wood pulp chips) the hole or apparture had a diameter of 3 inches and the distance X at the centre of the apperture was two inches. This positioned the apperture a suitable distance from the discharge end 46 of its chute 12 so that material in the size range of wood pulp chips could be metered at a rate suitable for the proper functioning of the splitter.

The top 54 is provided with a peripheral rim 58 to contain the chip sample when it is poured thereon to form a magazine for holding the chips as they are manually displaced through the hole 56 onto the chute 12. For convenience of access the top 54 is hinged to the main frame 24 so that it may be moved to the open position shown in FIG. 1 for access to the operating mechanism.

In the illustrated arrangement, the sample is to be quartered and thus two further chutes such as those indicated at 60 and 62 are mounted in a similar manner from the intermediate cross members 36 so that the bottoms of the chute are slopped in the opposite direction to the bottom 40 of the chute 12. Chutes 60 and 62 are constructed differently from the chute 12, simply to indicate a different form of structure that may be used as the chute. In this arrangement the chute has substantially arcurate bottom throughout its length i.e. there is no flat bottom 40 but rather a curved bottom. The chutes 60 and 62 taper in the same manner as chute 12 to a maximum lateral dimension at their back end to a minimum lateral dimension at the discharge ends 64 and 66. These chutes are on opposite sides of the plow 38 to receive the flows from the chute 12 i.e. each of the chutes 60 and 62 receives one half of the sample fed to chute 12.

The plows 68 and 70 associated with chutes 60 and 62 function in a different manner than the plow 38. It will be noted that these plows are fixed to the cross member 72 which is fixed to the main frame 24 of the separater 10 and thus the plows 68 and 70 do not oscillate with their chutes 60 and 62. It is important that these plows which will be substantially the same V-shaped cross section as the plow 38 have the lines forming their apex aligned with the longitudinal axis of their respective chutes 60 and 62 when their respective chutes 60 and 62 are in the precise mid-point of their lateral oscillation.

The flow from the chute 60 is split via the plow 68 and directed into the containers 74 and 76. Similarly the flow from chute 62 is split via plow 70 and deposits it in containers 78 and 80. These containers 74, 76, 78 and 80 are supported in a suitable manner on a frame 26 e.g. via frame members generally indicated at 82 and 84.

To prevent the sample of chips or other material leaving the chute 12 and entering the chutes 60 and 62 from being projected beyond the chute 60 and 62 baffle plate 47 is provided at the end of the chutes 60 and 62 spaced from the rear end 46 of the chute 12 in a position to obstruct of travel of the material leaving the chute 12 and deflect it to the chutes 60 and 62.

Figure 6:
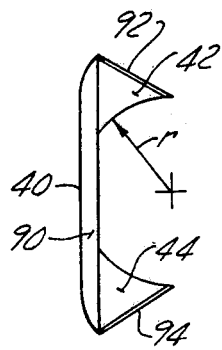
FIG. 6 is an end view of the chute of FIG. 5.
Figure 5:
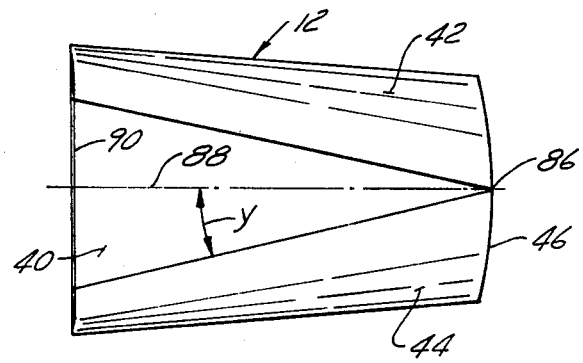
FIG. 5 is a plan view of the preferred form of chute used in the present invention.

As above indicated, FIG. 4 is a section along the line 4—4 of FIG. 3, however, the chute structures have been modified to eliminate the straps 48 and 50 used to support the various chutes 12, 60 and 62 and these chutes have been replaced with chutes of the type illustrated in FIGS. 5 and 6, this necessitated very minor changes between the structure of the sample splitter illustrated in FIG. 3 and that of FIG. 4. However, the chutes and other elements forming the device have retained their same reference numerals in FIG. 4 to facilitate understanding.

The chutes illustrated in FIG. 4 (the preferred embodiment of the present invention) are formed so that the top edges of each of the chutes 12, 60 and 62 forms a substantially horizontal line so that it may be easily connected directly to be adjacent supporting structure, such as the members 36 and 52. This structure permits the side walls to be higher and better ensures that no material easily spills over the side edges of the chutes as they are oscillated.

The chute 12 as illustrated in FIGS. 5 and 6 is composed with a substially flat bottom 40 that is triangular shape with the base of the triangle at the rear end of the chute and the apex 86 being formed at the discharge end 46. It will be noted that the chute 12 (as are all chutes used in the present invention), is substantially symmetrical relative to its longitudinal axis 88. The chute 12 is provided with a back wall 90 to prevent material from falling off from the back of the chute. The radius of curvature of the side walls 40 and 42 is substantially constant and is formed by wrapping the material to form the side walls 40 and 42 around the cylindrical object (not illustrated) arranged at an angle Y to the axis 88. This forms a circular arc of radius R at the discharge end 46 of the chute. The change in height of the side walls from the bottom 40 to the top edge as indicated at 92 and 94 determines the slope of the chute when mounted on the frame 41. The slope of the chutes has been indicated by the angle $\theta$ in FIG. 4 and will normally be the same for all chutes 12, 60 and 62 or any other number of chutes depending on the number of times the initial sample is to be divided.

It has been found adequate to divide the sample into four portions and should 1/16 portions then be required, take one of the four portions and resubdivide it by passing it through the sample splitter a second time. Any number of ¼ or 1/16 portions may be combined to produce a portion of the desired volume.

The specific dimensions of the chute are important but may vary depending on the particle size of the sample to be split. It has found that for a conventional chip sample used in the pulp & paper industry that the angle Y should be approximately 10°, radius R about 4 inches, slope $\theta$ about 10°. These conditions apply for oscillations of about 200 cycles per minute at an amplitude of 3 inches for a chute length for about 20 inches. Angle Y is not as important as the other dimension of the chute.

The oscillations of the frame 14 should be sufficiently fast to ensure that the chip slide on the surface of the chutes but not so fast as to bounce the material from the surface i.e. they must maintain substantial contract with the bottom surface of the various chutes. As above indicated about 200 cycles per minute has been found satisfactory for the chute dimensions indicated. This may be varied probably within the range plus or minus 50 cycles per minute but the variation permitted will depend on the material being processed.

The radius R has been set at 4 inches, however 5 inches has also been found satisfactory for operation with wood chips of a size which will pass through a 1½ inch mesh screen (average of about ¾ inch for a complete sample).

To obtain acceptable accuracy of the plows 38, 68 and 70 must be accurately positioned i.e. within the about 1/32 inch (or even closer) of the longitudinal axis of their respective chutes (as above described) and the oscillation must be substantially horizontal or the material will be displaced relative to the longitudinal centre line of the trays and satisfactory operation may not be obtained with the structure shown and described.

The oscillatory movement should be smooth. This is preferably obtained using a long crank arm i.e. a crank arm should be significantly greater than the stroke length i.e. for a 3" stroke a 12" to 18" crank lenght has been found adequate. Similar operation can be obtained using scotch yoke between the reducer and the frame 14 to oscillate the frame.

The slope determined by angle $\theta$ should be such as to ensure that the material slides down the chute as the chute is oscillated. This will be determined in part by the coefficient friction of the material relative to the chute. It has been found that 10° is adequate, 15° did not operate well as the wood chips slide down the chute too fast, while 7½° is also satisfactory. It is thus preferred to keep the slope at a relatively lower angle but sufficient to obtain a reasonable flow rate under the oscillating conditions so that the production of the equipment may be adequately maintained.

The length of the chutes is about 20 inches however this is not critical but is in important that they be at least sufficiently long that the material properly positions itself in the chute. The material must be travelling an equal amount up each side of the chute before is discharges off the end of the chute and will traverse the axial centre line of the chute at least about 5 times and preferably about at least 7 times. It has been found that 7 to 10 works very well for wood chips.

Obviously, the specific angles, speeds and dimensions given are based on dividing wood chips, if other materials are to be divided the characteristics of the equipment may require adaptation for optimum operation.

In operation, the sample to be split is deposited on the table top 54 and is manually fed through the apperture 56 onto the oscillating chute 12. The material slides back and forth as it slides down the chute 12 and eventually leaves the chute along an ever changing path oscillating back and forth from one side to the other of the plow 38 thereby to split the sample in half.

If the sample is to quartered, the half portions on one side of the plow 38 slides intgo the chute 64 and on the other side into the chute 66. These half portions oscillate with and on and slide down their respective chute and leave the discharge end of their respectable chute on paths that oscillate back and forth and pass to opposite sides of plow 68 and 70 due to both the oscillatory movement of the chute and to the movement of the chutes relative to their respective plows 68 and 70.

Figure 8:
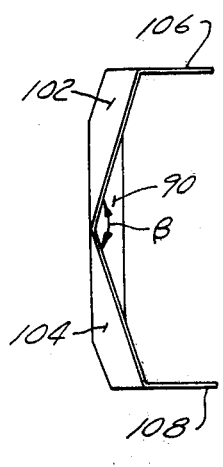
FIG. 8 is an end view of the chute of FIG. 7.
Figure 7:
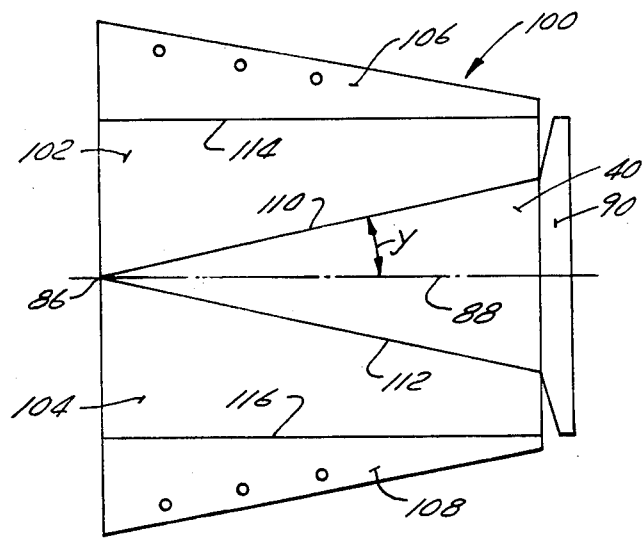
FIG. 7 is a view similar to FIG. 5 showing another form of chute.

Several shapes of chutes have been described hereinabove, but other suitable shapes may be used. For example, it is also possible to form the chutes with substantially flat side walls as indicated in FIGS. 7 and 8. In these figures like parts have been indicated by the same reference numerals as in FIG. 5. However, the side wall of the chutes 100 shown in FIGS. 7 and 8 comprise planer or flat sections 102 and 104 intersecting at the discharge end of the chute at an included angle B, in the order of about 150° i.e. it would generally be in the range of 170° to 130° and preferably will be about 150°. Vertical side walls such as those indicated at 106 and 108 may be used for anchoring unit into position and a rear wall 90 closes the back of the trough. This trough may be used in place of the trough such as those indicated at 12 or 60 and 62 in the above described embodiment.

The blank shown in FIG. 7 will be folded along the line 110 & 112 to bend the side walls 102 and 104 into the position shown in FIG. 8 and then the walls 106 and 108 are folded along lines 114 and 116 into the vertical position shown in FIG. 8.

Other shapes such as conical, cylindrical etc. walls may be used but in all cases the chute or trough is symmetrical on opposite sides of its longitudinal axis (which will be aligned with the ground direction of travel of the sample down the chute).

Modifications will be evident to those skilled in the art without departing from the spirit of the invention as defined in the appended claims.

I claim:
1. A sample splitter for particulates or small elements comprising at least one chute slopped downwardly from a rear end towards a discharge end, means for oscillating said chute on a substantially horizontal path substantially perpendicular to the axial center line of said chute, said chute being substantially symmetrical on opposite sides of said axial centre line, side walls on said chute on opposite sides of said centre line, said side walls being slopped upwardly in a manner such that the material forming said sample moves with a rolling or sliding action in a zig zag path on said chute and without significant bouncing of the material down said chute as said chute is oscillated, an elongated V-shaped plow at the discharge end of said chute to intercept material issuing from said chute, the line forming the apex of said V-shaped plow being substantially in alignment with axial centre line of said chute when said chute is at the mid-point of its oscillation.

2. A sample splitter as defined in claim 1 wherein said side walls are curved.

3. A sample splitter as defined in claim 1 wherein said side walls are substantially flat and extend at an included angle therebetween of between 130° and 170°.

4. A sample splitter as defined in claim 1 further comprising a pair of chutes positioned below said one chute, one of said pair of chutes adapted to receive adjacent its rear end material passing on one side of said plow, the other of said pair of chutes being positioned to receive adjacent its rear end material passing on the other side of said plow, said means for oscillating said pair of chutes on an essentially horizontal paths substantially perpendicular to the axial center line of each of said chutes, each of said pair chutes being substantially symmetrical on opposite sides its axial center line and having side walls on opposite sides of said centre line sloped upwardly in a manner such that material forming the sample moves with a rolling or sliding action in a zig zag path on said chutes and without significant bouncing action down each said chute of said pair of chutes and an elongated V-shapped plow at the discharge end of each chute of said pair of chutes to intercept material issuing from its respective said chute and having the line formed by the apex of each said pair of V-shapped plows, in substantially axial alignment without said axial center line of its respective chute of said pair of chutes when said respective chute is at the midpoint of its oscillation.

5. A sample splitter as defined in claim 1, 2 or 4 wherein said plow aligned with the axial center line of said one chute is fixed relative to said one chute.

6. A sample splitter as defined in claims 1, 2 or 4, further comprising a top closure positioned above said one chute, said closure having an aperture above said chute adjacent the upper end thereof.

7. A sample splitter as defined in claims 1, 2 or 4 wherein said one chute has a substantially V-shaped flat bottom wall with the apex of said V being positioned at said discarge end.

* * * * *